Figure 1:
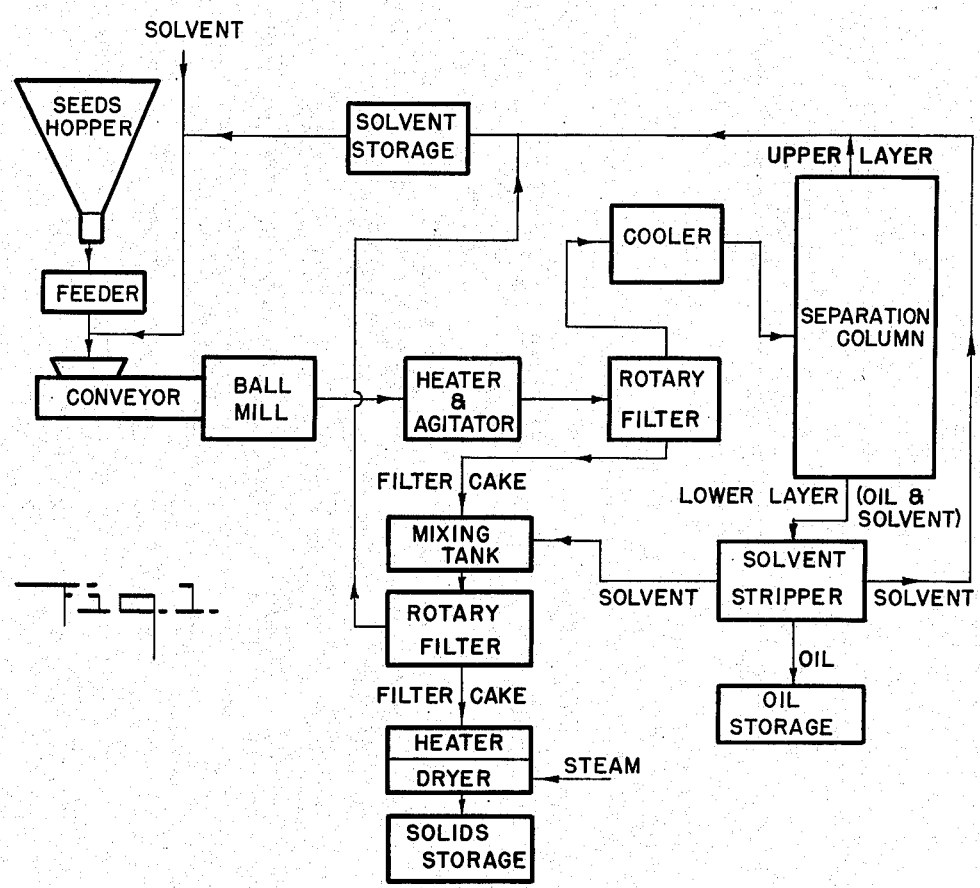

INVENTOR
IVOR M. COLBETH
BY Darby & Darby
ATTORNEYS

Patented Nov. 4, 1952

2,616,907

UNITED STATES PATENT OFFICE 2,616,907

PROCESS FOR SOLVENT EXTRACTION OF CASTOR OIL FROM CASTOR SEED

Ivor M. Colbeth, Maplewood, N. J., assignor to The Baker Castor Oil Company, New York, N. Y., a corporation of New Jersey Application April 18, 1950, Serial No. 156,701

9 Claims. (Cl. 260—412.4)

1

This invention provides a process for continuously extracting castor oil from castor seed with the aid of solvents. The process of this invention includes the following main steps: fine grinding of seed; converting the seed proteins to a nongelatinous form; separation of the miscella from the pomace; and chilling treatment of the miscella to separate the oil from the major portion of the solvent.

Solvent extraction methods for obtaining fatty oils from oil-containing seeds are in use at the present time. These methods require: the use of bulky equipment, which could not be transported from place to place without being dismantled; the use of undesirably large amounts of solvents; and the expenditure of an undue amount of energy in connection with the separation of the solvent from the oil by evaporation. According to the instant invention, it is now possible to extract castor oil from castor seed in equipment which can be readily transported without being dismantled, by a simple method which requires the use of comparatively small quantities of solvent, and which provides for a substantial and impressive reduction in the energy requirements as compared with the energy required in any of the previously existing solvent extraction processes.

One of the novel features of this invention which permits operation in a continuous manner involves converting the seed protein to a non-gelatinous form. This step can be effected by, e. g., heating the slurry of seed and solvent produced in the initial comminution step to a temperature in the range from about 150° to about 180° F. It has been found that heating of the slurry at the indicated temperatures results in the conversion of the protein present in the seed into a granular form. As a result, the subsequent separation of solids (pomace) from the miscella by filtration can be readily and quickly effected in a continuous manner. If the slurry is not heated to the indicated temperature, the protein remains in a slimy condition, and, thereby, renders any separation of the pomace from the miscella extremely difficult. If the slurry is heated to a temperature above the indicated range, the properties of the products formed by the process of this invention are adversely affected; e. g., undesirable discoloration of the oil results, also the solvent may be vaporized to an undesirable extent, unless special equipment is provided.

One of the novel features of this invention, which enables the indicated profound reduction in energy requirements, involves cooling the filtrate (miscella) to a temperature below 50° F. but above the temperature at which the oil crys-

2 tallizes from the miscella, whereby separation of the filtrate into two layers is obtained. The upper layer is low in oil content, whereas the lower layer is rich in oil. The upper layer is recirculated to the extraction system. The solvent is stripped from the lower layer, e. g., by steam distillation, and the desired castor oil is collected as a residue.

A typical practical working procedure for processing castor seed according to the process of this invention is presented in the following example, although it is to be understood that the invention is not limited to the procedure of the example.

Figure 2:
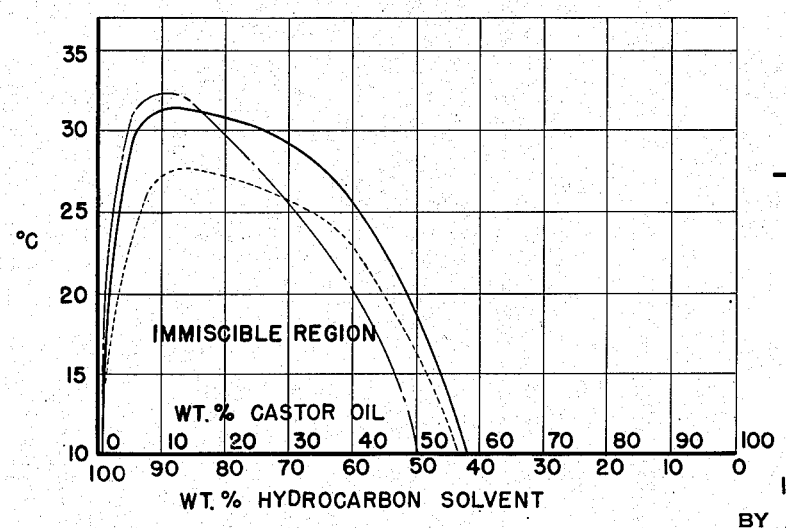

Referring to the accompanying drawings, illustrative embodiments of the invention are shown as follows:

Figure 1 is a flow sheet diagram of the essential steps in the process, including conventional illustration of the apparatus; and Figure 2 is a chart showing the miscibility relationship between castor oil and various hydrocarbon solvents at various concentrations and temperatures.

Referring to Figure 1, as explained above, the seeds are introduced from a feeder together with solvent onto a conveyor which is preferably of the screw type. The mixture of seeds and solvent is fed into the ball mill, after which it is directed into a heater and agitator and thence to a rotary filter to be described later in more detail. The filtrate leaves the rotary filter and is passed through a cooler into a separation column or decanter wherein an upper layer and a lower layer are separated. The upper layer consists primarily of a solvent with a small amount of oil and is fed back to the solvent storage tank preferably after a further distillation stage for purification of the solvent. The lower layer within the separation column, which consists of relatively high concentration of oil in the solvent, is fed to a solvent stripper whence part of the solvent is redirected back into the initial stage of the cycle, i. e., via solvent storage. Another portion of the solvent is fed to the mixing tank wherein it is mixed with the filter cake from the rotary filter. After further contacting of solvent with the filter cake, the mixture is introduced into a second rotary filter whence the solvent with relatively small percentage of oil is fed back into the solvent storage tank again preferably after a distillation stage for purification. The residual cake from the second rotary filter is fed into a heater and a dryer, and, after steaming, is deposited in a solids storage container. The oil from the solvent stripper is collected in an oil storage tank.

Referring to Figure 2, the curves show the range of temperatures in degrees centigrade below which castor oil becomes immiscible with typical aliphatic hydrocarbon solvents, depending upon the relative concentration by weight of castor oil to hydrocarbon solvent. The solid curve is for heptane; the dotted curve is for hexane; and the dot-dash curve is for naphtha having a distillation range between about 150° F. and 280° F. For example, it is apparent that at temperatures above about 29° C., 30% by weight of castor oil in 70% by weight of heptane produces a compatible or miscible mixture, whereas below about 29° C., the same solution divides into two layers, the upper layer comprising primarily heptane and the lower layer comprising primarily castor oil.

EXAMPLE

In this example, the process for extracting castor oil from castor seed is described on the basis of a pilot plant set-up handling 1 ton of castor seed in 24 hours. Castor seed, in general, contains approximately 25% hull, 25% protein-bearing material, and about 50% oil.

Castor seed is deposited in a hopper, and is withdrawn at a uniform rate by means of an automatic scale feeder. The amount of seed so withdrawn can be adjusted to any suitable rate of flow to the processing unit. The rate of withdrawal used in this instance is 82 lbs. of castor seed per hour, the seed being delivered by the moving belt of the feeder to a screw conveyor which transfers the seed to a steel ball mill. This transfer may be direct, or the seed may be decorticated prior to feeding into the ball mill. Power consumption is reduced by omitting the decortication step, but when this intermediate step is included, the color of the final oil product is improved, and the free flow of solid and liquid components through the system is enhanced, in that there is a markedly reduced tendency for solids to separate by gravity in the lines.

A simultaneous charge to the ball mill is a paraffinic petroleum naphtha (bus naphtha), which is fed in at the rate of 1.3 gallons per minute (or 468 lbs. per hour); this rate is measured by the use of a rotameter. The naphtha, which has a distillation range of from 150° F. to 280° F., acts as the extracting solvent.

The ball mill runs continuously. The charge of balls occupies a volume which is approximately one-eighth of the total volume of the ball mill. The balls used are approximately from 2 to 3 inches in diameter, and are made of non-sparking, ceramic material, such as porcelain. The ball mill has an internal diameter of 60 inches and an internal length of 48 inches and is operated preferably about at room temperature, or slightly higher. The ball mill is so constructed that the feed (castor seed and solvent) enters it via a trunnion (the hollow shaft of which may act as a support for the ball mill) at one end of its axis. The ground slurry or pulp is discharged through a similar opening at the other end of the axis.

In the ball mill, the seed is ground (this being the primary function of the ball mill), and the castor oil is simultaneously extracted to some extent by the naphtha. A suitable degree of fineness of grind is about 20 mesh, that is, the particles are about $\frac{1}{10}$ to about $\frac{1}{16}$ of an inch in diameter. For ease of subsequent processing, it is desirable that the castor seed should not be ground any finer than about 20 mesh in the ball mill. If the seed particles are, on the average, finer than the indicated lower size limit, the filter used in the subsequent filtration of the slurry containing the fine particles tends to become clogged, and the resulting pomace is dusty and inconvenient to handle.

The slurry, which is discharged from the ball mill, flows from the mill to a holding tank which is supplied with a steam coil and an agitator. The slurry is heated in this tank to a temperature of about 160° to about 170° F., and is stirred constantly so as to maintain the solids in suspension. At this elevated temperature, the protein content of the seed is denatured and, thereby, the ensuing filtration proceeds smoothly. There is no loss of solvent during this heating step as provision is made for the condensation of solvent vapors. The slurry is removed from this tank by means of a helical, screw-type pump having a positive displacement action and is then delivered to a rotary type filter, wherein the liquids are separated from the solids (pomace).

The rotary type filter, which has a filter area of about 18 square feet, separates the miscella from the pomace. The resulting filtrate consists of about 447 lbs. of naphtha and 41 lbs. of castor oil per hour, and, in the same period, the filter cake amounts to approximately 41 lbs. of pomace, 21 lbs. of residual naphtha, and 4 lbs. of castor oil.

The filtrate is run to a surge tank, and is then pumped through a water-cooled heat exchanger. The filtrate is subsequently cooled to a temperature of about 32° F. by passing it through a second heat exchanger which is refrigerated by means of a gaseous hydrocarbon, e. g. freon.

From the cooling operation, which results in layer separation, the naphtha and oil are pumped to a gravity separator. The upper layer, which consists principally of naphtha, is decanted and returned to the solvent system for the purpose of recirculation through the process. The lower layer is drawn from the separator and consists, per hour, of approximately 38 lbs. of naphtha and 40 lbs. of castor oil in a homogeneous mixture. This solution is then pumped through a series of heaters to a steam stripping column, where the naphtha is stripped from the castor oil; the oil is drawn off from the bottom of the tower to a product tank. The stripping operation is essentially a steam distillation. The tower overhead passes to a condenser and then to a separator, where the stripping steam is condensed and separated. The pure recovered naphtha is dropped to a surge tank, from which it is pumped to the recovered solvent storage tank or to a mixing tank in which the initial filter cake is reslurried. The hourly yield of oil from the separating tower is approximately 40 lbs.

Advantageous results accrue if, prior to this distillation step, the castor oil is subjected to a refining treatment while in solution in the gasoline. In this case, the viscosity of the oil is reduced by the presence of the solvent, rather than by an increase in temperature; this is important, since the adsorption isotherm is not affected as much by the temperature as by the degree of dispersion of the constituents to be removed by the refining treatment. The refining treatment consists of acid and/or color removal. Acid removal can be accomplished readily by continuously contacting the oil solution with, e. g., sodium hydroxide solution, in a continuous neutralizer as disclosed in Colbeth U. S. Patent 2,183,486. Color removal can be effected by contacting the oil solution with suitable bleaching and filtering media, such as the acid-activated bleaching earths prepared from montmorillonite, e. g., "Neutrol" and "Filtrol"—products of the Filtrol Corporation, adsorptive clays consisting of hydrated aluminum and magnesium silicates, e. g., fuller's earth, and activated carbons, e. g., "Darco"—a product of the Darco Company. The earths or clays are suitably used in the amount of 2% per 100 lbs. of castor oil present, while the carbon black is advantageously used simultaneously in the amount of 0.5% on the same basis.

An enormous advantage as regards the color of the oil results from this bleaching of the castor oil in solution. Further color improvement can be achieved by decortication of the seed and separation of the hulls prior to subjecting the seed meats to the extraction operation.

The filter cake from the rotary filter is deposited in a small mixing tank, where it is re-slurried with solvent recovered from the stripping column. The final extraction of the oil occurs in this tank, the oil content of the pomace thus being reduced from about 8 to 10% to about 1%. The fresh slurry is then sent to a second rotary filter, having a filter area of about 12 square feet; the resulting filtrate is pumped to the used solvent tank for recirculation to the ball mill.

Steam may be applied to the second filter in order to drive off residual solvent from the filter cake. The cake is then discharged from the filter and sent to the storage hopper. If it is desired to remove the last traces of solvent from the filter cake, the latter is passed through a dryer into which open steam is introduced, before being sent to storage. The heat treatment of the pomace, to steam off solvents at this stage, or to effect the coagulation of the proteins earlier in the process, results in the detoxification of the pomace, so that it becomes suitable for use as a source of proteins in prepared animal feeds.

OPERATING CONDITIONS

Comminution

One of the important features of the ball mill operation is the continuous flow of the castor seed to the mill. There was originally some difficulty observed in getting the seed through the long trunnion into the ball mill. An aluminum screw conveyor which turns with the mill and draws the seed from the entrance point through the trunnion provides a satisfactory solution to this difficulty. However, care must be taken that the liquid level in the mill is not so high that the seed will float in the naphtha and out of reach of the screw conveyor. As regards the seed itself, it is advantageous to solvent-wash and dry it before it is ball milled.

As indicated above, ball mills or pebble mills may be used for grinding the castor seed. It is, of course, possible to utilize other means for comminuting the nondehulled castor seed in the presence of volatile organic solvents. Hammer mills suitable for wet grinding and certain other comminuting machines may also be used for comminuting the seed.

Originally, a perforated plate was placed at the exit of the ball mill in order to retain insufficiently ground seed in the mill. This perforated plate clogged easily as the pomace in slurry form has a tendency to bridge over the openings. A somewhat unsatisfactory solution consisted in placing a ¼ inch mesh screen at an angle in the discharge pipe leading from the mill. An alternative arrangement, which proved to be completely satisfactory, involves the use of a perforated plate in the exit line of the ball mill, the surfaces of this plate being kept clean by the action of two cylindrical brushes, these brushes being mounted so as to come in contact with both surfaces of the plate. These brushes were made of pig bristles, and were arranged to clean the plate during rotation of the mill. No discharge difficulties are observed with this arrangement.

Extracting solvent

The solvent used in the extracting and ball milling operation is preferably of the saturated, acyclic hydrocarbon type. It has been found that the presence of aromatic or other cyclic hydrocarbons in the solvent cause the extraction of color bodies from the seed to an undesirable extent. Further, the presence of cyclic hydrocarbons in the solvent prevents or retards the separation of the miscella into two layers in the cooling operation. The naphtha used in the illustrative example is a mixture of heptane, octane, and nonane. The use of paraffinic hydrocarbons boiling lower than 60° C., as solvent, requires maintenance of pressure in the system in order to reach the temperatures at which the proteins in the seed are denatured or coagulated. However, such hydrocarbons, including propane, may be used as the extraction solvent where it is feasible to maintain the entire extraction system under pressure. The use of excessively high boiling hydrocarbons (e. g., boiling point over about 250° C.) is not desirable, since they could not be separated as readily as the preferred solvents from the oil in the steam stripping operation. Individual hydrocarbons such as hexane, heptane and octane, may be used, but there is an economic advantage to using mixtures of such hydrocarbons. In choosing a naphtha, it should be borne in mind that the lower boiling naphthas have less solvent power for the castor oil at low temperatures than do the higher boiling naphthas. Consequently, it is preferable to use the lower boiling naphthas in the present process from the standpoint of the better separation of oil that can be effected thereby in the cooling operation.

In addition to the separation of oil from seeds with the aid of solvents, it is possible to effect this separation by the use of non-solvents, which act as carriers for the oil. Thus, finely ground castor seed may be contacted with water in the presence of small amounts of wetting agents, the use of the latter being desirable in order to effect better contact between the oil and the water. When water is used as the extracting agent, it has been found preferable to use tannic acid instead of heat for insolubilizing the protein.

In connection with this latter stage in the process, namely, the denaturation of the protein, the use of heat for the denaturation may be supplanted by the use of chemicals in the process of the present invention. For this purpose, chemicals such as formaldehyde, tannic acid, acetic acid, mineral acids, heavy metal salts, are effective. Lead salts are the preferred heavy metal compounds, since their use causes no discoloration of the oil or protein.

The proportion of solvent to seed is, in the illustrative example, about 5 to 1, on a weight basis. This is not necessarily the optimum relationship, as less solvent would have to be handled and recovered if the proportion were 3 to 1 or 2 to 1. However, the use of solvent in the proportion indicated in the illustrative example provides a slurry which is fluid enough to be readily handled, and concentrated enough so that the separation effected in the chilling step is an economical operation.

Filtration and other process steps

It is important to provide a proper pump to handle the slurry which is discharged from the ball mill. A continuous screw-type pump, which has small discharge lines to give fairly high velocity, is eminently suitable for moving this slurry. Open impeller centrifugal pumps may also be used when high capacities are involved.

There are two steps involved in the filtration of the slurry discharged from the heating tank, and both steps presented complicated engineering problems. The first step involves separating the miscella from the solid constituents of the slurry by means of a filter. In this connection, it was found that the pomace settles out of the naphtha at a very fast rate, and, in order to prevent clogging of the lines, it was found to be advantageous to provide effective agitation in the heating tank and to pump the slurry through the lines at a rapid rate. The filtration of the slurry is also greatly benefited by the treatment in the heating tank, since this heat treatment prevents the coating of the filters with a slimy deposit during the filtration operation. The actual filtration is effected in a continuous manner by the use of a rotary hopper vacuum dewaterer.

The rotary hopper vacuum dewaterer is a rotary type filter having compartments mounted on its rim as described in the copending patent application of Colbeth and Carter, Serial No. 156,702, filed April 18, 1950. Its operation comprises dropping the slurry into the compartments at the top of the drum cycle. The solvent is drawn into the drum of the filter by means of the vacuum; and the compartment walls serve to prevent the solid particles from dropping from the drum until the solvent has been so removed. When a compartment reaches the bottom of the drum cycle, the deposited filter cake drops or is blown out into a suitable receptacle. The compartment then returns to the top position, where it is refilled with slurry. A refinement which permits great flexibility in the use of this filter comprises discharging the compartments through separate lines, thereby enabling segregation of different fractions of the filters. An additional filtration step involving the use of a pressure leaf filter is frequently desirable to effect the separation of fines which may be present to the extent of up to about 1.5% in the miscella.

Alternatively, if desired under particular circumstances, the separation of the pomace from the miscella may be effected by the use of a mechanical classifier, or by decantation (gravity), instead of by filtration. Other types of rotary vacuum filters, such as those with bottom feed and/or string discharge, may be used, if desired.

The desirable effect of heating the slurry may be attributed to coagulation of the protein present in the pomace. In the case of the illustrative example presented herein, the denaturing is carried out in a tank which has about a 50 gallon capacity and will retain the slurry for about 30 minutes. The treatment of the slurry at about 150°–160° F. is effected while the slurry is being agitated. The indicated temperature range has been found to be the preferable range for this heat treatment.

The second step in the filtration operation involves washing adhering miscella from the meal before the latter is dropped from the filter compartment, fresh solvent being used for this purpose. The effluent from this washing operation is collected separately from the straight miscella, this being possible through the use of a separate discharge line for the washing operation.

An alternative procedure consists in reducing the oil content of the pomace by washing the same with alcohol instead of with the hydrocarbon solvent used in the main extraction operation. An additional fraction thus obtained contains lecithin, and is highly suitable for use as an antioxidant, as a wetting or emulsifying agent, as a lubricant in the processing of leather, as an ingredient of paper sizing, of soap stock, or of fat-liquoring compositions, and the like.

In the cooling operation, the temperature to which the miscella is chilled, for proper layer separation should be below 50° F., preferably below 41° F., but above the temperature at which the oil crystallizes from the miscella. When relatively large amounts of water are present in the system it is desirable that the temperature not be lowered below 32° F. so as to prevent the water from freezing. However, the presence of water in the system is not normal, and, consequently, economic considerations will determine the temperature to which the miscella is cooled in a particular case. In the case of castor oil-gasoline miscella, cystallization of the oil occurs well below 0° F., the exact temperature depending on the relative amounts of castor oil and gasoline present. The temperature of the miscella may be reduced to these low temperatures, without recourse to heat exchange units, by applying a vacuum to the miscella; a prerequisite for this procedure is that the miscella contain adequate amounts of a low-boiling component.

In general, the oil content of the lower layer of the miscella obtained from the cooling operation is about 50–55%, with the gasoline content being about 50–45%. The oil content of the upper layer of this miscella ranges less than about 3%; the usual range for the oil content of the upper layer is 0.5–1.0%.

The seed hulls may be separated from the rest of the filter cake by a flotation process. The separated hull material is an important and useful abrasive.

One of the advantages of the process of this invention is that the seed proceeds through the solvent extraction equipment at a rapid rate. Even so, it is important that the seed should have a minimal moisture content, as otherwise objectionable amounts of fatty acids and glycerin are formed during the extraction operation. It is also desirable to incorporate inhibiting agent for the seed enzymes at the comminution step of the process; tannins are among the suitable inhibiting (coagulating) agents for the enzymes.

The advantages of the present process include: compactness and portability; low power consumption; small amounts of solvent required; the small amount of material which may be processed at any one time; improve processing with lower costs through replacement of prior art steps of hydraulic pressing, solvent extraction, and refining with one continuous operation.

It has not previously been possible to construct a unit for the extraction of castor seed and the like which could be readily transported in operating condition to the various geographical centers at which the materials to be subjected to the process of this invention are produced. Equipment suitable for carrying out the process of this invention can be installed for example, on a trailer truck, railway car, or a small boat. Various factors cooperate to make possible the small, readily transportable extraction unit of this invention. Thus, the quantity of solvent required is comparatively small. The filtering arrangement and the heating unit are small. The heat requirement is low, so that ordinary small steam boilers can be used. Also, the rapid throughput of seed, together with the small amount of seed being processed at any one time, enable the use of a small extraction unit.

Prior art processes for the production of castor oil involve the use of hydraulic pressing equipment, which is not adapted to continuous operation, and requires a considerable amount of manual manipulation. While solvent extraction has been used in the prior art, the novel and economical chilling method of this invention for separating castor oil from the solvent has not hitherto been available. And the advantages which accrue from refining in solution according to the process of this invention, namely, improved oil color, reduced fatty acid content of the oil, and ease of refining at relatively low or room temperature as opposed to the elevated temperatures required by the prior art, serve to increase the benefits which can be derived from operating according to the process of this invention. It can readily be appreciated that the combination of the several steps of the present invention into one continuous operation requiring a minimum operating staff provides a highly useful and novel process for the production of castor oil from castor seed.

One of the important advantages of the present process is the low expenditure of energy necessary for the separation of solvent from the oil. The following hypothetical case will exemplify the principles involved. Assume a mixture which contains 10% of castor oil and 90% of gasoline at a temperature of 100° F. If the mixture is cooled to 30° F., the resulting upper layer would contain 0.15% castor oil and 99.85% gasoline, while the lower layer would contain 53% castor oil and 47% gasoline.

Assume further that it is desired to separate castor oil from 10% solution of castor oil and gasoline, by a prior art process involving distillation only. Assume commencement with 10,000 pounds of a mixture consisting of 9,000 pounds of gasoline and 1,000 pounds of castor oil and that the temperature of this mixture is 100° F. The following facts are required for the necessary calculations: the specific heat of castor oil is 0.514 and that of the gasoline is 0.529; the average boiling point of the gasoline is 220° F., and its latent heat of vaporization is 133 B. t. u. per pound.

The first calculation will be to determine the heat needed to distill the gasoline from the mixture in order to recover the castor oil. The mixture will have to be heated from 100° F. to 220° F. The heating will be continued until all of the gasoline evaporates. Let A equal the B. t. u. required to raise the mixture to the boiling point of the gasoline, and let B equal the B. t. u. required to evaporate the gasoline. The sum of A and B will, therefore, represent the total heat required to distill the gasoline expressed in B. t. u.

*Calculation of A*

$A = W \times S \times T$

Where $W$ = Weight of each component of the mixture.
$S$ = Specific heat of each component.
$T$ = The difference between the temperature of the gasoline entering the still and its boiling point.
$A = a' + a''$
$a'$ = Heat to raise castor oil to 220° F. = $W_{oil} \times S_{oil} \times T$
$a''$ = Heat to raise gasoline to 220° F. = $W_{gas} \times S_{gas} \times T$
$a' = 1000 \times .514 \times (220-100) = 61,680$
$a'' = 9000 \times .529 \times (220-100) = 571,300$
$A = 61,680 + 571,300 = 632,980$ B. t. u.

*Calculation of B*

$B$ = Wt. of gasoline × latent heat of vaporization.
$B = 9000 \times 133 = 1,197,000$ B. t. u.
$A + B = 632,980 + 1,197,000 = 1,829,980$ The total B. t. u. for the distillation of the gasoline is, therefore, 1,829,980 B. t. u.

Since each pound of steam (the source of heat for the distillation) condensed yields 1000 B. t. u., 1,829,980 B. t. u. would be the equivalent of 1,830 pounds of steam. Then, with the cost of steam currently averaging $1.00 per 1000 lbs., the cost of steam for this particular distillation would be $$\frac{1,829,980 \times 1.00}{1000 \times 1000} = \$1.83$$

By way of contrast, consider the amount of energy needed to separate the gasoline from the castor oil by the process of this invention. According to the invention, 10,000 pounds of the mixture would be cooled from 100° F. ($T_1$) to 30° F. ($T_0$). The amount of the lower layer would consist of 1886 pounds which would contain 886 pounds of residual gasoline and 1000 pounds of oil. The residual gasoline would, of course, have to be removed by distillation. Incidentally, no mention of the respective requirements for stripping steam is made in this comparison of the previous and present processes for the separation of castor oil from the miscella. This factor was not introduced into the calculations because of the equivalence of the two processes in this particular regard.

The calculation of the energy needed can be made in three steps:

$C$ = The amount of refrigeration needed.
$D$ = The heat needed to distill the residual gasoline.
$E$ = The heat needed to raise the chilled upper layer to the extraction temperature, so that this recovered gasoline can be recirculated through the process.

*Calculation of C*

$C$ = Wt. of mixture ($T_1 - T_0$) sp. heat = $1,000 \times .514 \times (100-30) + 9,000 \times .529 \times (100-30) = 369,280$ B.t.u.

*Calculation of D*

$D$ = The amount of heat necessary to distill the residual gasoline. This can be divided into two steps, F and G.
$F$ = The heat necessary to raise the mixture to the boiling point.
$G$ = The heat necessary to evaporate the residual gasoline.
$F$ = Wt. of mixture × temp. rise × sp. heat
$F = 1000 \times .514 \times (220-30) + 886 \times .529 \times (220-30) = 186,710$ B.t.u.
$G$ = Wt. of gasoline × latent heat of gasoline.
$G = 886 \times 133 = 117,840$ B.t.u.
$D = F + G$
$= 186,710 + 117,840 = 304,550$ B.t.u.

Calculation of E $E$ = Heat to raise gasoline from 30° to 100° F.
= Wt. of gasoline × sp. heat × temp. rise
= 8114 × .529 × (100−30)
= 300,470 B.t.u.

The cost of the refrigeration can be determined on the basis of the current charge of 1.35 cents per kilowatt hour (this being equivalent to 12,000 B.t.u. per hour), as follows:

$$\frac{369{,}280 \times .0135}{12{,}000} = \$0.42$$

The cost of steps D and E can be calculated in the same manner as the cost of the all-distillation process. Thus, $$D + E = 304{,}550 + 300{,}470 = 605{,}020 \text{ B.t.u.}$$

And using the same steam cost, we obtain as the cost of these steps:

$$\frac{605{,}020 \times 1.00}{1000 \times 1000} = \$0.61$$

The total cost of the chilling process is, then:

$$0.42 + 0.61 = \$1.03$$

In summary the old method would cost $1.83 for each 10,000 pounds of the gasoline-castor oil mixture handled, while the method of this invention would cost $1.03 on the same basis. In other words, the total cost of the old method (as per this example) is 78% greater than that of the method of the present invention.

The process of this invention turns out a large yield of oil per unit of time, and this is one of the factors which permits the design of extraction units which have only a small amount of material being processed at any one time. In previous processes, prolonged contact and heating of the seed with the solvent were required. However, the finely ground seed used in the present process permits ready contact of the seed with the solvent, and, consequently, rapid solution of the oil in the solvent. Thus, the problems encountered with the leaching operation in previous processes are completely obviated in the process of the present invention.

What is claimed is:

1. A process for the manufacture of castor oil from castor seed, comprising the steps of: (a) comminuting the seed, (b) contacting the comminuted seed with a volatile, aliphatic hydrocarbon solvent, (c) converting the seed proteins to a non-gelatinous form, (d) separating from the seed solids the solution of castor oil in said solvent, (e) cooling said solution to a temperature at which it separates into two immiscible layers, each of said layers comprising a solution of castor oil and said solvent, the lower layer having a higher oil content by weight percentage than the upper layer, (f) separating said lower layer from said upper layer, and (g) recovering the castor oil from said lower layer.

2. The process of claim 1, in which step (c) comprises heating the slurry consisting of comminuted seed and solvent in a holding vessel at a temperature of from about 150° to about 180° F.

3. The process of claim 1, in which step (c) is effected by the use of a coagulating agent for proteins.

4. The process of claim 1, in which the temperature attained by the miscella during step (e) is below 41° F. but above the temperature at which the oil crystallizes.

5. The process of claim 1, in which the upper layer from step (f) is recycled through the extraction processing units.

6. The process of claim 1, in which the starting seed in step (a) includes seed hull.

7. The process of claim 1, in which, subsequent to step (f) and prior to step (g) said lower layer is subjected to a refining and bleaching treatment.

8. The process of claim 1 in which the weight percent of castor oil in said lower layer is less than 60%.

9. A process for the manufacture of castor oil from castor seed, which comprises preparing a mixture of non-gelatinous castor seed solids and a solution of castor oil in a volatile, aliphatic hydrocarbon solvent, separating from the seed solids the solution of castor oil in said solvent, cooling said solution to a temperature at which it separates into two immiscible layers, each of said layers comprising a solution of castor oil and said solvent, the lower layer having a higher oil content by weight percentage than the upper layer, separating said lower layer from said upper layer, and recovering the castor oil from said lower layer.

IVOR M. COLBETH.

REFERENCES CITED

The following references are of record in the file of this patent:

UNITED STATES PATENTS

| Number | Name | Date |
| --- | --- | --- |
| 1,892,366 | Sato et al. | Dec. 27, 1932 |
| 2,183,837 | Hamilton et al. | Dec. 19, 1939 |
| 2,200,391 | Freeman | May 14, 1940 |
| 2,377,975 | Singer et al. | June 12, 1945 |
| 2,377,976 | Singer et al. | June 12, 1945 |
| 2,467,403 | Pascal | Apr. 19, 1949 |
| 2,502,484 | Saunders | Apr. 4, 1950 |

FOREIGN PATENTS

| Number | Country | Date |
| --- | --- | --- |
| 336,274 | Great Britain | Oct. 10, 1930 |

OTHER REFERENCES

Dean-Utilization of Fats (1938) Chemical Publishing Co., of New York, page 152.

Jameson-Vegetable Fats and Oils, 2nd edition (1943) Reinhold Pub. Co., pp. 48 to 50.

Markley et al., Soybean Chemistry & Technology Chemical Publishing Co., Brooklyn, N. Y. (1944) pp. 193–4.